United States Patent
Frosch

(10) Patent No.: US 6,209,346 B1
(45) Date of Patent: Apr. 3, 2001

(54) TAILGATE PICNIC DEVICE

(76) Inventor: David C. Frosch, 14 Daffodil La., Madison, WI (US) 53714

( * ) Notice: Subject to any disclaimer, the term of this patent is extended or adjusted under 35 U.S.C. 154(b) by 0 days.

(21) Appl. No.: 09/452,303

(22) Filed: Dec. 1, 1999

(51) Int. Cl.[7] .................................................. F25D 3/08
(52) U.S. Cl. .................... 62/457.7; 62/457.1; 206/545
(58) Field of Search ............................... 62/457.7, 457.1, 62/530; 220/592.1, 592.03; 206/541, 545, 549

(56) References Cited

U.S. PATENT DOCUMENTS

| 1,176,473 |   | 3/1916  | Loring . |            |
|-----------|---|---------|----------|------------|
| 1,562,855 |   | 11/1925 | Tinkess . |           |
| 2,522,322 |   | 9/1950  | Wallace . |           |
| 4,537,044 | * | 8/1985  | Putnam ................................... | 62/457 |
| 4,541,540 | * | 9/1985  | Gretz et al. . |          |
| 4,630,671 | * | 12/1986 | Sherman et al. ........................ | 62/457 |
| 4,830,190 | * | 5/1989  | Inagaki ............................ | 62/457.7 X |
| 5,116,240 | * | 5/1992  | Wischhusen et al. ................ | 206/545 |
| 5,244,271 |   | 9/1993  | Hackwood et al. . |        |
| 5,257,509 | * | 11/1993 | Harris ............................. | 62/457.7 X |
| 5,485,921 | * | 1/1996  | Tolendano ............................ | 206/545 |
| 5,501,338 | * | 3/1996  | Preston ................................ | 206/545 |
| 5,575,521 |   | 11/1996 | Speis . |            |
| 5,626,126 |   | 5/1997  | McNulty . |          |
| 5,727,857 |   | 3/1998  | Smith . |            |
| 5,842,571 | * | 12/1998 | Rausch ................................ | 206/549 |
| 5,924,303 | * | 7/1999  | Hodosh ........................... | 62/457.7 X |

* cited by examiner

Primary Examiner—Corrine McDermott
Assistant Examiner—Chen-Wen Jiang
(74) Attorney, Agent, or Firm—Ryan Kromholz & Manion, S.C.

(57) ABSTRACT

A picnic tailgate device includes a housing with a lid hingedly connected thereto. The housing is internally divided into a plurality of zones including an insulated zone for supporting food-containing containers therein and maintaining the containers in a warm condition. The housing further has a cool compartment for supporting a plurality of food-containing containers in a chilled condition, the cool housing including an enclosed ice-containing chamber for nestingly supporting the food containers thereby maintaining the cool temperature of the chilled foods. Preferably a handle attached to a side of the device for carrying purposes and, optionally included, are legs for supporting the device during use.

7 Claims, 3 Drawing Sheets

TAILGATE PICNIC DEVICE

BACKGROUND OF THE INVENTION

This invention relates to a tailgate picnic device. More particularly the invention relates to such a device which accommodates the storage and presentation of both hot and cold foods.

Tailgate picnic gatherings have increased in popularity at the sporting events such as football games. Additionally, hot and cold foods are often provided at family picnics, beach activities, parties and festivals. Typically it has been necessary to utilize a plurality of containers for hot and cold foods so that food can be stored and presented safely at the desired temperature. Due to the need for such multiple containers a need has still existed for a simple unitary device for use at such gatherings.

SUMMARY OF THE INVENTION

This invention has a primary object of providing a picnic tailgate device in which food both hot and cold can be stored, transported and presented in the same device at gatherings such as athletic tailgate events where the food is consumed. The present invention provides such a device which is particularly convenient for such gatherings where time is somewhat at a premium so that both hot and cold foods can be presented and consumed utilizing the same tailgate picnic device without the need for cooking the food on the premises. Alternatively the device can be used in conjunction with a portable barbecue means and the barbecued food contained for a time therein in a warm condition for subsequent consumption.

In accordance with one important aspect of the invention the picnic tailgate device of the invention is provided with hot and cold sides each of which conveniently nestingly receives food containers which are maintained in a warm or cold condition as desired. In accordance with a further related aspect the warm side of the picnic tailgate device is insulated and the food containers are nestingly received in a cover depressed in said insulation to maintain the food contained therein in a warm condition until consumed. In accordance with a further related aspect of the invention the cold side of the device also contains recesses for nestingly receiving food containers for containing chilled foods and a compartment for containing ice beneath said containers is provided. In accordance with another important aspect, an internal divider between said hot and cold sides of the device is provided.

Briefly, the invention provides A picnic tailgate device includes a housing with a lid hingedly connected thereto. The housing is internally divided into a plurality of zones including an insulated zone for supporting food-containing containers therein and maintaining the containers in a warm condition. The housing, further, has a cool compartment for supporting a plurality of food-containing containers in a chilled condition, the cool housing including an enclosed ice-containing chamber for nestingly supporting the food containers thereby maintaining the cool temperature of the chilled foods. Preferably a handle attached to a side of the device for carrying purposes and, optionally included, are legs for supporting the device during use.

BRIEF DESCRIPTION OF THE DRAWINGS

FIG. 3 is a fragmentary sectional view taken along line 3—3 of FIG. 2;

FIG. 4 is a fragmentary sectional view taken along line 4—4 of FIG. 2;

DETAILED DESCRIPTION OF THE INVENTION

Figure 1:
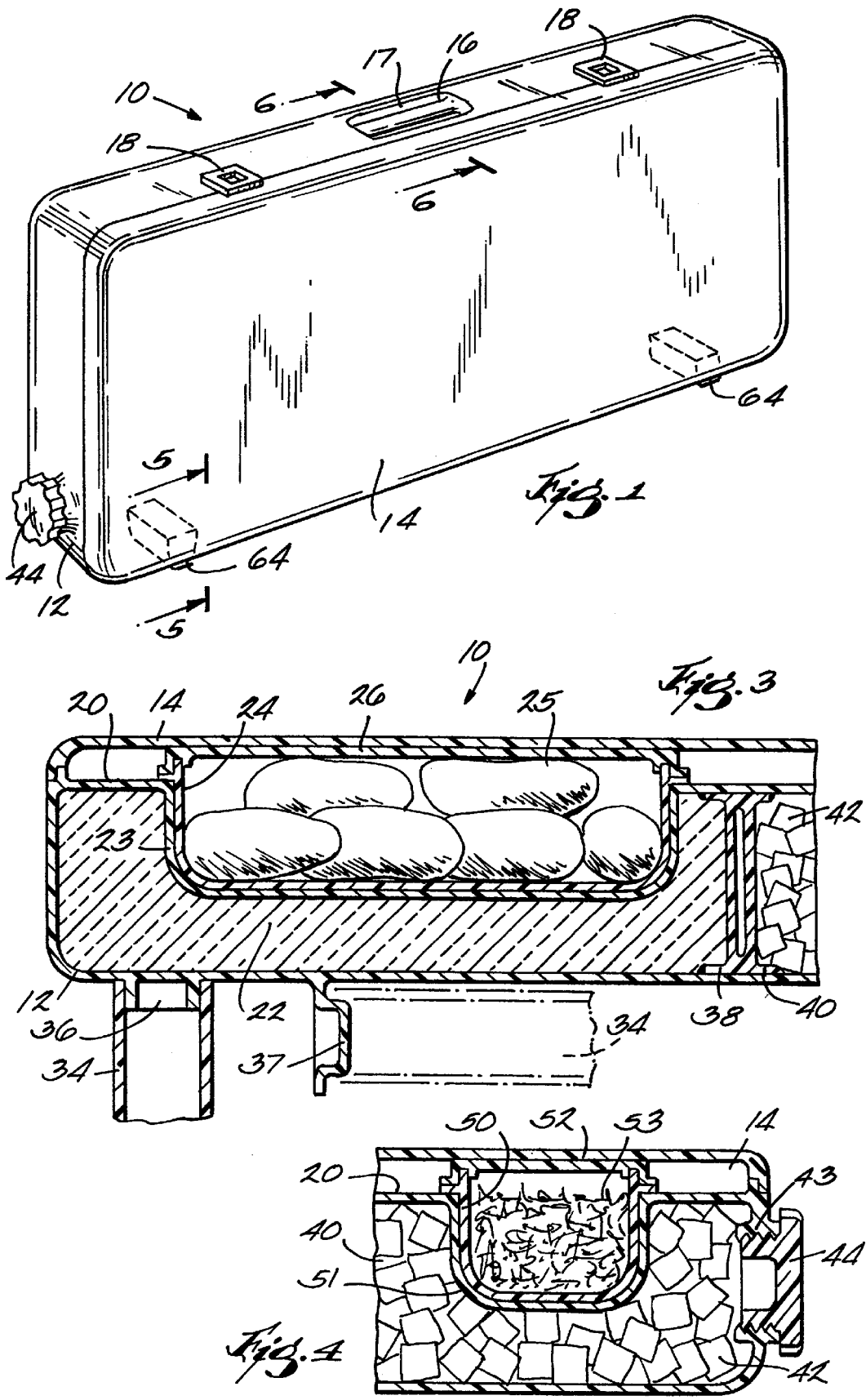
FIG. 1 is a perspective view of a device in accordance with the invention in the closed position showing some hidden parts by means of phantom lines.

Referring more particularly to FIG. 1, a tailgate picnic device of this invention is indicated generally by numeral 10. Device 10 includes a bottom housing component 12 to which a lid 14 is hingedly connected.

Figure 2:
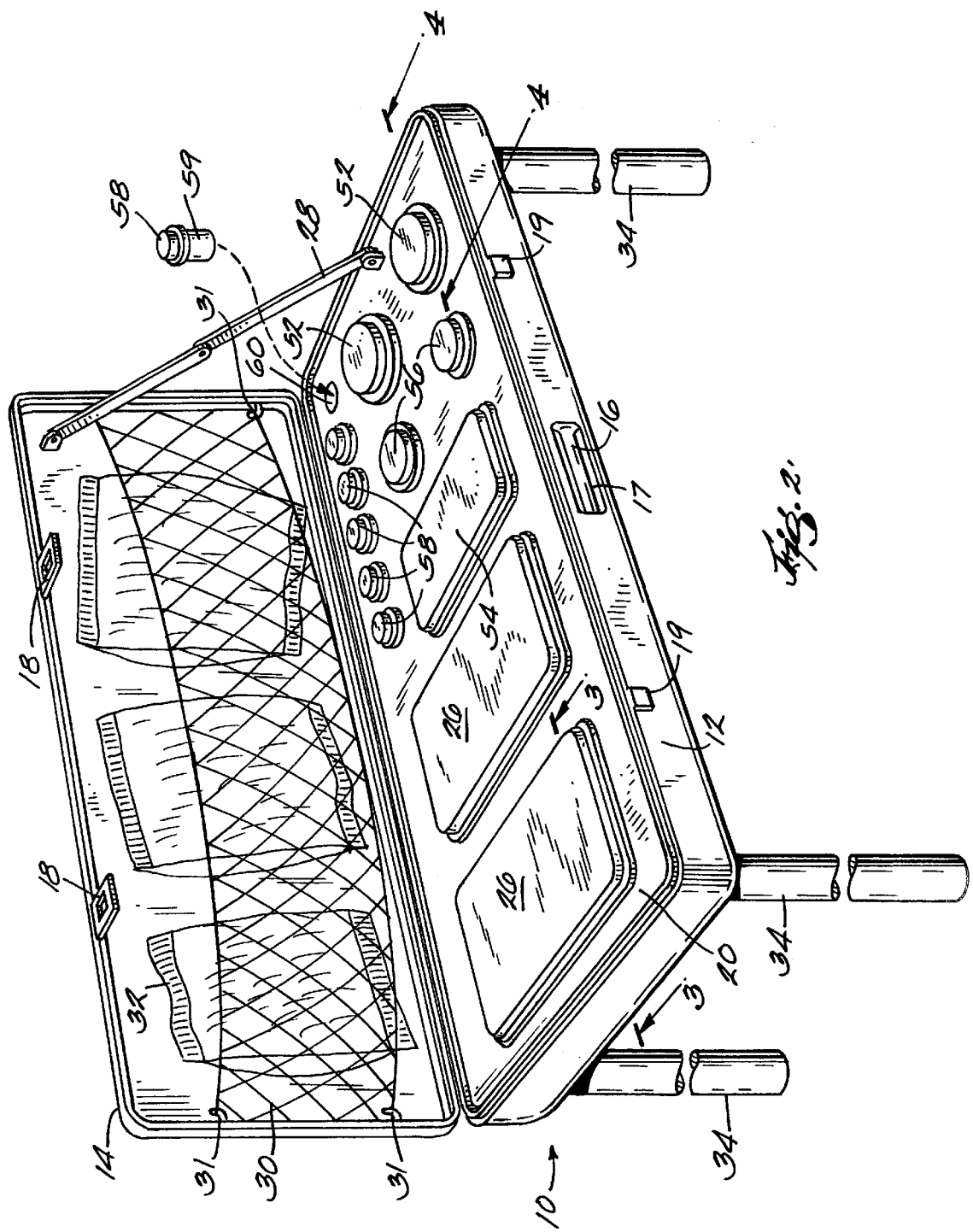
FIG. 2 is a perspective view of the device of FIG. 1 shown in the open position with supporting legs attached thereto and showing food packages in conjunction therewith.
Figure 6:
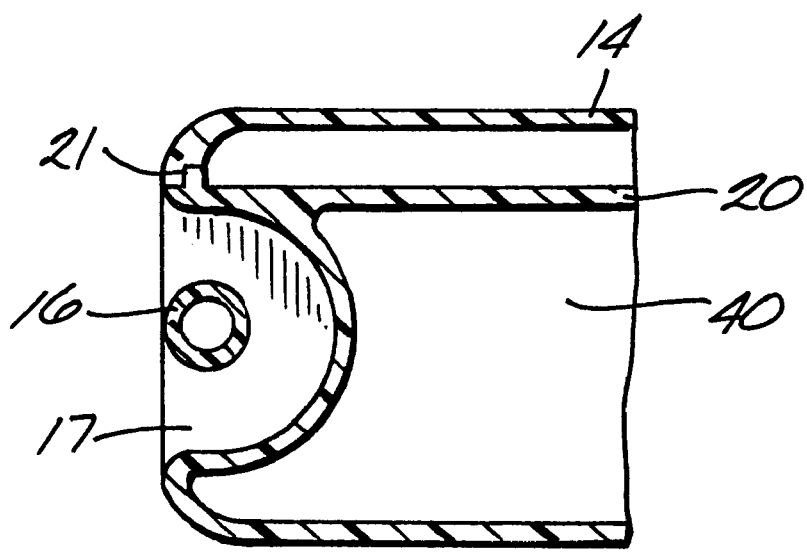
FIG. 6 is a fragmentary sectional view taken along line 6—6 of FIG. 1.

A centrally located carrying handle 16 is, preferably positioned in a recess 17 in housing component 12. As best seen in FIG. 6, opening 17 is sized to allow manual grasping of handle 16. Also, as seen in FIGS. 1 and 2 a pair of lock members 18 are provided. Lock members 18 may be integrally formed with lid 14, if lid 14 is formed of a molded plastic material. In such event, interfitting lock components 19 can be provided on bottom housing component 12. Also, as seen in FIG. 2, a hinged support member 28 can be provided for supporting lid 14 in an upright position during use of the tailgate picnic device 10.

Housing 12 is provided with an internal cover 20. Cover 20 as seen in FIGS. 3 and 4 may be formed integrally with housing 12. However, cover 20 may, instead, be formed of a separate piece which is connected to housing 12, for example, by snap fitting together.

The left half of tailgate picnic device 10 as viewed in FIG. 2 is designed to keep hot foods warm. For that purpose thermal insulation 22, which may be, for example, an insulative plastic foam is positioned between lid 20 and housing 12. The right half, as viewed in FIG. 2, is designed to keep cold foods chilled.

As best seen in FIG. 3, lid 20 is provided with two or more depressions 23 which are designed to nestingly receive a warm food container 24. Container 24 is preferably a plastic bowl. However, it will be apparent that ceramic or metal containers could be substituted, if desired. Warm food 25 may be, for example, in the form of meat, hot sandwiches, baked beans, potatoes, hot dishes, etc. Each of the hot food containers 24 is provided with a snap on plastic lid 26.

As viewed in FIG. 2, lid 14 can be provided with an elastic net 30 for conveniently holding packages 32 which may contain snack foods, crackers, buns, etc. Tabs 31 can be provided on cover 14 for the purpose of retaining net 30.

Referring to FIGS. 2 and 3, legs 34 may be provided to support the tailgate picnic device 10 on the ground, if desired. For that purpose stub leg ends 36 are provided on the bottom of housing 12 so that they can telescopingly receive the inside of legs 34. Legs 34 may be either round as shown or alternatively of a square tubular or other appropriate cross sectional configuration. Also, as best seen in FIG. 3, four support protuberances 37 can be attached to or formed integrally with the bottom of housing 12 for storage of legs 34 when the tailgate picnic device 10 is not in use.

As also seen in FIG. 3 an internal divider 38 can be provided to separate the hot and cold sides of the tailgate device 10. Divider 38 is preferably formed of a hollow I-shaped cross section, as illustrated, in order to enhance the thermal insulative value thereof. Other configurations can, of course, be used instead.

As seen in FIGS. 3 and 4, the cold side of the tailgate picnic device 10 includes a chamber 40 for containing ice cubes 42. An opening 43 closed by a removable plug 44 is provided for access to the interior of chamber 40. Thus water can be readily drained therefrom and additional ice added when required. As also seen in FIG. 4, cover 12 is provided with numerous depressions 51 designed to nestingly receive containers 50. The containers 50 are provided with snap on lids 52 and are designed to hold a food product 53, for example salads of various kinds, and other food preparations which need to be kept in a chilled condition.

As seen in FIG. 2 the cold side of the picnic tailgate device 10 can include containers of various sizes. For example a larger sized container, the lid 54 of which is seen in FIG. 2 can nestingly be received in a depression in top panel 20 similar to the example illustrated in FIG. 4. Also, smaller sized containers 56 can be provided to include various side dishes. Additionally, a series of condiment containers 58 are provided. Each condiment container has a snap on or threaded lid 58 on a bottom container portion 59 which is nestingly received in opening 60. Appropriate labeling can be applied to the containers for convenience in use.

Figure 5:
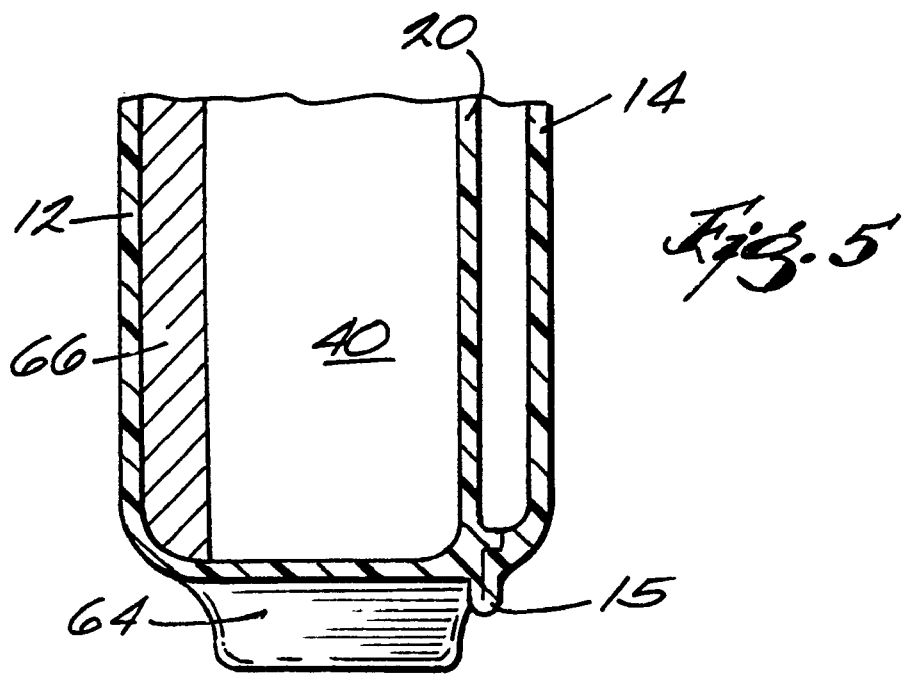
FIG. 5 is a fragmentary sectional view taken along line 5—5 of FIG. 1.

Also, as seen in FIGS. 1 and 5 lugs 64 can be provided on the bottom side of housing 12 to form supporting legs for storage and transportation of the picnic tailgate device 10. Also seen in FIG. 5 are the cross sectional details of a living hinge which hingedly connects lid 14 and top 20 of bottom housing 12.

In order reduce condensation or "sweating" on the exterior of the cold section chamber 40, a layer of insulation 66 may optionally be applied to the inner surface of bottom wall 12 as seen in FIG. 5. Insulation 66 may be, for example, a close-celled foam in order to avoid water saturation thereof. Otherwise, an impervious plastic layer may be coated over the top of foam insulation layer 66.

While preferred embodiments have been illustrated and described herein it will be apparent to those skilled in the art that various additional modifications can be provided in accordance with the spirit of the invention and the scope of the appended claims.

What is claimed is:

1. A picnic tailgate device comprising a housing and a lid hingedly connected thereto;

said housing being internally divided into a plurality of zones including an insulated zone for supporting food containing containers therein and maintaining said containers in a warm condition;

said housing further comprising a cool compartment for supporting a plurality of food-containing containers in a chilled condition, said cool compartment including a chamber for nestingly supporting said food containers and a chamber for containing ice for maintaining the cool temperature of said chilled foods, said housing enclosing an internal cover having a plurality of depressions therein for nestingly receiving food containers.

2. A device according to claim 1 wherein said housing has a handle attached to a side thereof for carrying said device.

3. A device according to claim 1 wherein said housing is provided with a plurality of removable legs for support thereof during use.

4. A device according to claim 3 wherein means is provided on said housing for supporting said legs during storage.

5. A device according to claim 1 wherein said ice containing chamber is provided with an access opening with a removable lid for addition of ice thereto.

6. A device according to claim 1 wherein said depressions are also formed in foam insulation positioned between said housing and said internal cover.

7. A device according to claim 1 where the interior of said lid is provided with an elastic net for holding packages of food when said device is in use.

* * * * *